(12) United States Patent
Dalton

(10) Patent No.: US 8,567,201 B2
(45) Date of Patent: Oct. 29, 2013

(54) ECOLOGY SYSTEM FOR DRAINING THE MANIFOLD OF A GAS TURBINE ENGINE

(75) Inventor: William H. Dalton, Amston, CT (US)

(73) Assignee: Triumph Engine Control Systems, LLC, West Hartford, CT (US)

(*) Notice: Subject to any disclaimer, the term of this patent is extended or adjusted under 35 U.S.C. 154(b) by 0 days.

(21) Appl. No.: 13/170,862

(22) Filed: Jun. 28, 2011

(65) Prior Publication Data
US 2013/0000318 A1 Jan. 3, 2013

(51) Int. Cl.
F02G 3/00 (2006.01)
F02C 7/232 (2006.01)

(52) U.S. Cl.
USPC .............................. 60/772; 60/39.094; 60/734

(58) Field of Classification Search
USPC ............... 60/39.094, 734, 776, 772; 417/284, 417/307, 440, 434
See application file for complete search history.

(56) References Cited

U.S. PATENT DOCUMENTS

| | | | |
|---|---|---|---|
| 6,195,978 B1 * | 3/2001 | Futa, Jr. ..................... | 60/39.094 |
| 6,375,435 B2 | 4/2002 | Sundberg et al. | |
| 6,442,925 B1 | 9/2002 | Dalton et al. | |
| 6,474,938 B2 | 11/2002 | Dalton et al. | |
| 6,623,250 B2 | 9/2003 | Zagranski et al. | |
| 6,634,865 B2 | 10/2003 | Dalton | |
| 6,663,357 B2 | 12/2003 | Dalton et al. | |
| 6,719,543 B2 | 4/2004 | Gentile et al. | |
| 6,786,702 B2 | 9/2004 | Zagranski et al. | |
| 6,821,093 B2 | 11/2004 | Zagranski et al. | |
| 6,962,485 B2 | 11/2005 | Bennett et al. | |
| 6,996,969 B2 | 2/2006 | Dalton et al. | |
| 7,083,394 B2 | 8/2006 | Dalton | |
| 7,200,985 B2 | 4/2007 | Tuttle et al. | |
| 7,207,785 B2 | 4/2007 | Dalton et al. | |
| 7,430,851 B2 * | 10/2008 | Patwari ..................... | 60/39.094 |
| 8,046,983 B2 | 11/2011 | Lawrence et al. | |

* cited by examiner

Primary Examiner — William H Rodriguez
Assistant Examiner — Karthik Subramanian
(74) Attorney, Agent, or Firm — Dann, Dorfman, Herrell & Skillman, PC

(57) ABSTRACT

A fuel system including a fuel pump metering unit (FPMU) for delivering fuel to an engine manifold with an ecology valve for draining and storing fuel from the engine manifold. The ecology valve includes a housing having a piston dividing the housing into a first side in fluid communication with an output of the FPMU and a second side in fluid communication with the engine manifold. An assembly connected between the FPMU and engine manifold selectively creates a pressure differential across the first and second side of the housing when the FPMU delivers fuel to the engine manifold. In a run position, the piston moves to decrease a volume within the housing interior as a result of the pressure differential. In a drain position, the piston moves to increase the housing volume within the interior and thereby pull and store fuel from the engine manifold.

14 Claims, 5 Drawing Sheets

ECOLOGY SYSTEM FOR DRAINING THE MANIFOLD OF A GAS TURBINE ENGINE

BACKGROUND OF THE INVENTION

1. Field of the Invention

The subject invention is directed to an ecology system for draining fuel from the manifold of a gas turbine engine and more particularly, to an ecology system for draining and storing liquid fuel from the manifold in a self-contained manner.

2. Background of the Related Art

Manifold draining systems are useful in aerospace applications where gas turbine engines are used. If the fuel is allowed to remain in the engine manifold after shutdown, the fuel may collect to create a hot start or coke from heat exposure. To avoid these problems, several systems have been developed.

In a traditional system, a separate tank is used to collect fuel from the manifold by actuating a solenoid valve. Other systems also send the manifold fuel back to the fuel tanks by an alternative flowpath. In either case, the fuel system is closed such that the volume pulled back out of the manifold must be absorbed or stored somewhere in the fuel system. Utilization of separate/external means to store the volume of manifold fuel is particularly undesirable to manage as is inclusion of alternative flowpaths and devices like the aforementioned solenoid.

Examples of ecology systems for fuel systems are disclosed in: U.S. Pat. No. 5,809,771 to Wernberg issued on Sep. 22, 1998; U.S. Pat. No. 6,314,998 to Futa, Jr. et al. issued on Nov. 13, 2001; U.S. Pat. No. 6,385,962 to Futa, Jr. et al. issued on May 14, 2002; and U.S. Pat. No. 6,751,939 to Futa, Jr. et al. issued on Jun. 22, 2004, the disclosures of which are herein incorporated by reference in their entirety.

SUMMARY OF THE INVENTION

In view of the above, it would be desirable to provide an ecology valve for a fuel system that has a simple, efficient and reliable design for draining the engine manifold and storing the drained volume of fuel. The subject technology discloses an ecology valve that has differential volume depending upon the position of a piston within the ecology valve, thus additional return lines or external storage can be eliminated. The ecology valve moves to an increased storage volume position after engine shutdown to drain the engine manifold, and restores the fuel to the nozzles at the next start by returning to a run position with reduced storage volume. The subject technology is also suitable for use as a modification of existing equipment and systems.

In one embodiment, the subject technology is directed to an ecology valve for draining and storing fuel from a manifold of a gas turbine engine. The ecology valve includes a housing defining: an interior; a first port in fluid communication with a fuel pump metering unit (FPMU) for receiving fuel output from the FPMU; and a second port in fluid communication with the manifold. A piston is mounted for sliding movement within the interior between a run position and a drain position. In the run position, the interior contains a first volume of fuel. In the drain position, the interior contains a second volume of fuel, the second volume being greater than the first volume. A spring is coupled between the housing and the piston to normally bias the piston in the drain position. The subject technology may also utilize at least one sealing o-ring mounted in an opening of the housing for sealing the shaft during movement between the run and drain positions such that in the drain position, the shaft extends at least partially out of the opening so that the second volume is greater than the first volume.

Another embodiment of the subject technology is a fuel system with a fuel pump metering unit (FPMU) for delivering fuel to an engine manifold. The fuel system includes an ecology valve for draining and storing fuel from the engine manifold. The ecology valve includes a housing having a piston dividing the housing into a first side in fluid communication with an output of the FPMU and a second side in fluid communication with the engine manifold. An assembly connects between the FPMU and engine manifold for selectively creating a pressure differential across the first and second side of the housing when the FPMU delivers fuel to the engine manifold. In a run position, the piston moves to decrease a volume within the interior as a result of the pressure differential, and in a drain position, the piston moves to increase the volume within the interior and thereby pull and store fuel from the engine manifold.

The assembly may be a muscles valve, a flow divider, a pressurizing valve, a fixed orifice, and the like. The assembly may also be integral to the FPMU. Preferably, in the drain position, the shaft extends at least partially out of the opening and the head portion defines a passage for fuel flow between sides of the housing. The fuel system may also include a restrictor between the housing and the engine manifold.

Still another embodiment of the subject technology is directed to a method for draining fuel from an engine manifold including the steps of delivering fuel to the engine manifold, coupling an ecology valve to the engine manifold, creating an increase in a volume in the ecology valve during shutdown of delivery of the fuel such that the ecology valve pulls fuel from the engine manifold, and storing the drained fuel in the increased volume.

The method may also include the steps of restarting delivery of fuel to the engine manifold, and creating a decrease in the volume to redeliver the drained fuel to the engine manifold. The ecology valve includes a housing having a piston that moves between a drain position at least partially outside the housing to create the increase and a run position substantially within the housing to create the decrease. Preferably, the method includes the steps of normally biasing the piston into the drain position, creating a pressure differential across the piston when delivering fuel to the engine manifold to move the piston into the run position, and providing a passage through the piston for fuel flow.

It should be appreciated that the present invention can be implemented and utilized in numerous ways, including without limitation as a process, an apparatus, a system, a device, and a method for applications now known and later developed. These and other unique features of the system disclosed herein will become more readily apparent from the following description and the accompanying drawings.

BRIEF DESCRIPTION OF THE DRAWINGS

So that those having ordinary skill in the art to which the subject invention appertains will more readily understand how to make and use the same, reference may be had to the following figures.

DETAILED DESCRIPTION OF PREFERRED EMBODIMENTS

Figure 1:
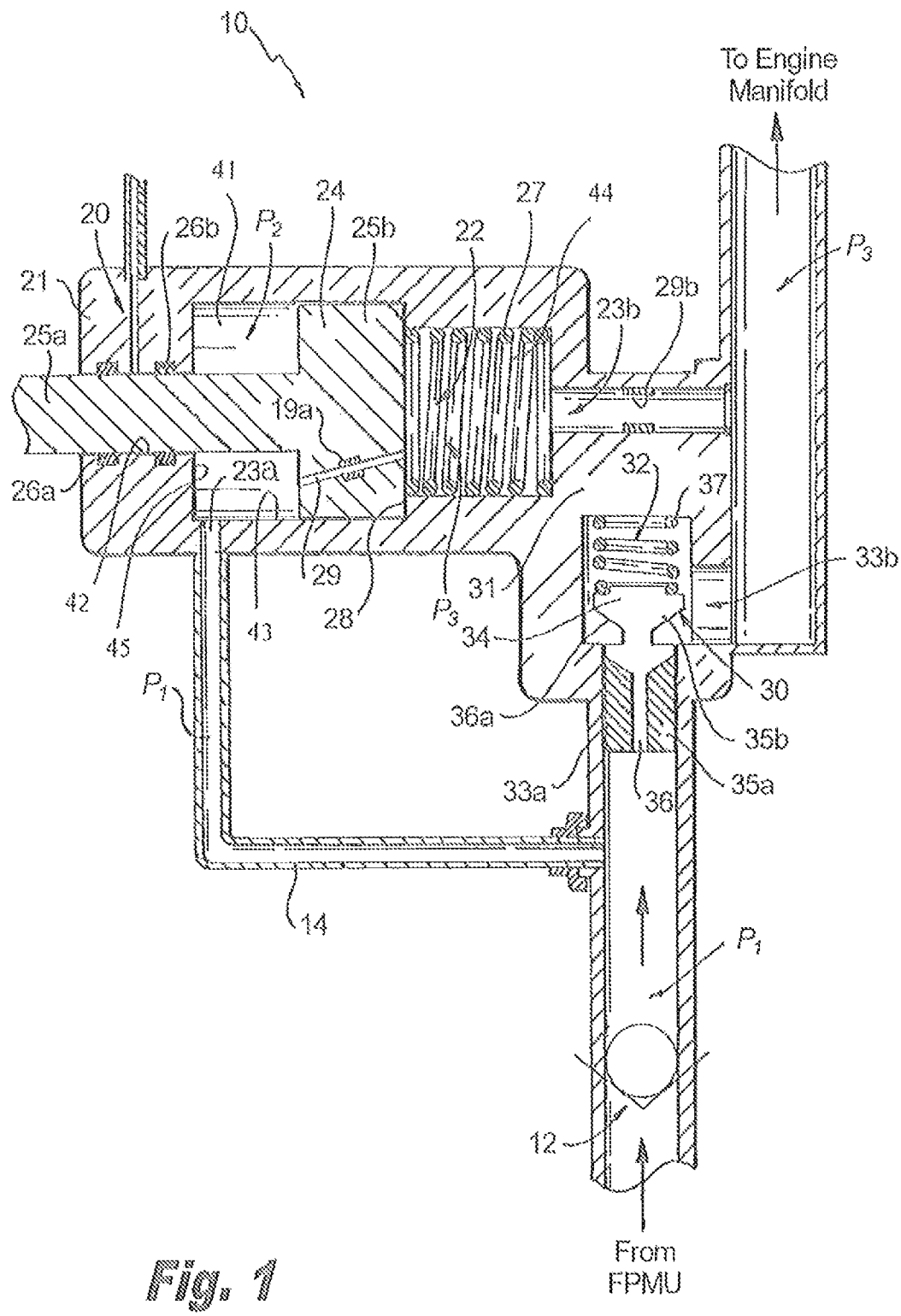
FIG. 1 is a schematic cross-sectional representation of a portion of a fuel system having an ecology valve constructed in accordance with the subject technology shown in the running or fuel delivery position.

The present disclosure overcomes many of the prior art problems associated with removing fuel from engine manifolds and the like. The advantages, and other features of the technology disclosed herein, will become more readily apparent to those having ordinary skill in the art from the following detailed description of certain preferred embodiments taken in conjunction with the drawings which set forth representative embodiments of the present invention and wherein like reference numerals identify similar structural elements.

All relative descriptions herein such as left, right, up, and down are with reference to the Figures, and not meant in a limiting sense. Unless otherwise specified, the illustrated embodiments can be understood as providing exemplary features of varying detail of certain embodiments, and therefore, unless otherwise specified, features, components, modules, elements, and/or aspects of the illustrations can be otherwise substituted, combined, interconnected, sequenced, separated, interchanged, positioned, and/or rearranged without materially departing from the disclosed systems or methods.

Additionally, the shapes and sizes of components are also exemplary and can be altered without materially affecting or limiting the disclosed technology. For clarity throughout the following description, arrows are shown within the flowpaths or lines of fuel systems to indicate the direction in which the fuel flows and an annotated letter "P" is shown to indicate a pressure at certain locations at various times in the fuel delivery cycle. Additionally, for clarity common items such as filters have not been included in the Figures.

First Embodiments

Figure 2:
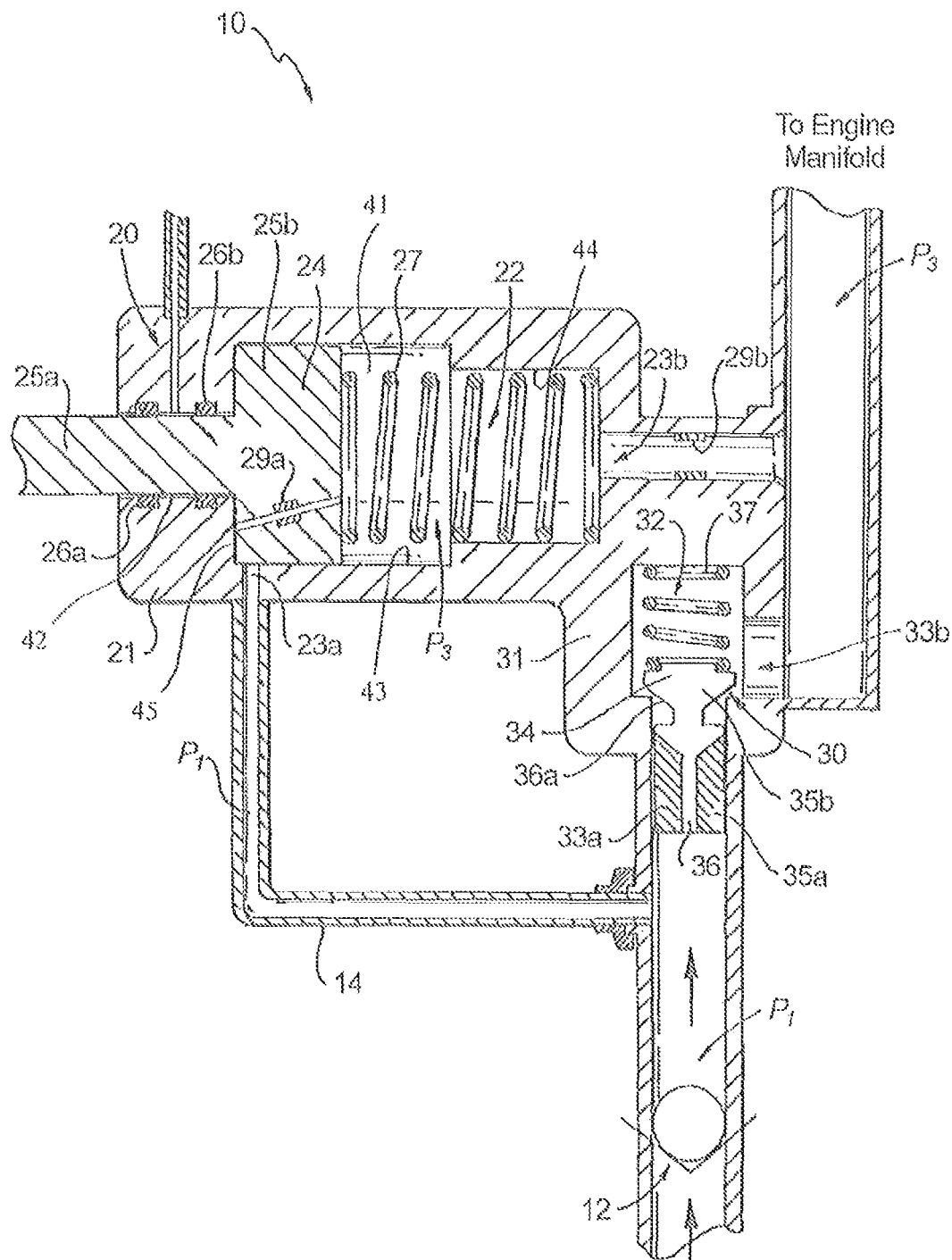
FIG. 2 is a schematic cross-sectional representation of the portion of the fuel system of FIG. 1 and shown in the shutdown or no fuel delivery position.

Referring now to FIGS. 1 and 2, there are illustrated schematic cross-sectional representations of a portion of a fuel system 10 having an ecology valve 20 in accordance with the subject invention. The fuel system 10 pumps fuel from a fuel tank (not shown) to an engine manifold (not shown). Upon engine shutdown, the ecology valve 20 drains the engine manifold and stores the drained volume of fuel for subsequent redelivery upon engine start up.

The fuel system 10 includes a fuel pump and metering unit (FPMU) pressure valve 12 among other components not shown to filter and control delivery of high pressure fuel. The FPMU pressure valve 12 acts as a check valve to help maintain pressure downstream thereof at pressure $P_1$. The fuel flows from the FPMU pressure valve 12 to a muscles valve 30, which creates a pressure differential. The muscles valve 30 creates a pressure differential from the input pressure at $P_1$ to the output pressure $P_3$ with pressure $P_3$ being lower than pressure $P_1$ when fuel flows to the engine. It should be appreciated by those of ordinary skill in the art that other types of devices for creating pressure differentials such as flow dividers, fixed orifices, and other valves like pressurizing valves, similarly and differently arranged would perform this same function and are, therefore, considered design choices well within the scope of the subject technology.

The ecology valve 20 is connected to both sides of the muscles valve 30. The ecology valve 20 has a housing 21 defining an interior 22 with inlets 23a, 23b. Inlet 23a is connected to the outlet of the FPMU pressure valve 12 (i.e., pressure $P_1$) by line 14 whereas inlet 23b is connected to the outlet of the muscles valve 30 (i.e., pressure $P_3$). The interior 22 defines a piston interior 41 that slidably receives a piston 24 having a shaft 25a terminating in a head 25b. The piston interior 41 has varying diameters. A first, smallest diameter portion 42 surrounds the shaft 25a. A second, largest diameter portion 43 surrounds the piston head 25b. A third, intermediate diameter portion 44 houses a spring 27. As can be seen in FIG. 1, the largest diameter portion 43 forms a first or run side shoulder 28 on the right by transitioning down to the intermediate diameter portion 44. A second or shut down side shoulder 45 is formed on the left by the largest diameter portion 43 transitioning down to the smallest diameter portion 42. Two o-rings 26a, 26b seal the shaft 25a to maintain the fuel system 10 closed.

The piston head 25b divides the interior 22 into two pressure zones (a right or front side and a left or back side), the left part or back side of the piston head 25b at pressure $P_2$ and the right part or front side of the piston head 25a at pressure $P_3$. The spring 27 is housed in the intermediate diameter portion 44 and biases the piston 24 to the left, toward a shutdown position with the piston head 25b against the end shoulder 45 as shown in FIG. 2. In the steady-state running position shown in FIG. 1, when the pressure $P_2$ on the left of the piston head 25b exceeds the pressure $P_3$ on the right of the piston head 25b, the piston head 25b is forced against the shoulder 28 formed in the housing 21, The piston head 25b also forms a passage 29 between the left and right sides of the interior 22 to allow fuel to flow there through. The passage 29 may include a restrictor 29a to limit the flow there through. A second optional restrictor 29b may be included adjacent the inlet 23b to help damp the effect of pressure changes on the piston 24.

The muscles valve 30 also includes a housing 31 defining an interior 32 with an inlet 33a and outlet 33b. The inlet 33a is connected to the outlet of the FPMU pressure valve 12 (i.e., pressure $P_1$) and the outlet 33b feeds the engine manifold at pressure $P_3$. The muscles valve interior 32 also slidably receives a piston 34 having a shaft 35a terminating in a head 35b. The piston 34 also defines a central flowpath 36 for fuel through the muscles valve 30 when in the running position as shown in FIG. 1. The piston 34 has a valve portion 36a that can close the flowpath when in the shutdown position as shown in FIG. 2.

The piston head 35b is normally biased downward by a spring 37 into the drained or shutdown position shown in FIG. 2. During shutdown, the spring 37 forces the piston 34 downward so that the valve portion 36a seals against the housing 31 stopping flow. When fuel flows in the running position of FIG. 1, the piston head 35 overcomes the force of the spring 37 and moves upward. Throughout the fuel system 10, springs are sized as a function of the product of piston area and fuel pressure as would be appreciated by those of ordinary skill in the art and therefore not further described herein.

In Operation

Referring now to FIG. 1, the ecology valve 20 and the muscle valve 30 are shown in a steady-state running position with the FPMU (not shown) delivering fuel to the engine manifold and, thereby, opening the muscles valve 30. The muscles valve 30 creates a pressure differential so that pressure $P_3$ is less than pressure $P_2$. The pressure differential is sufficient so that the spring force in the ecology valve 20 is overcome by the piston 24, which is moved all the way to the right in a reduced volume position.

Upon shutdown of fuel delivery, the check valve 12 prevents return flow to the FPMU so that the fuel system 10 shown has pressure equalize under the lack of flow (e.g., pressure $P_1=P_2=P_3$). Once pressure equalizes, the springs 27, 37 in the valves 20, 30, respectively, drive the pistons 24, 34 to the drained position shown in FIG. 2. In the ecology valve 20, the piston shaft 25*a* moves outside the housing 21. The optional restrictor 29*b* damps the movement of the piston 24 within the ecology valve housing 21.

As the piston shaft 25*a* is no longer within the interior 22 of the ecology valve 20, additional volume within the interior 22 is created. The volume increase pulls fuel from the engine manifold into the interior 22 to empty the engine manifold. In the event that the muscles valve 30 is closed before draining is completed, the passage 29 allows fluid transfer across the piston head 25*b*. The amount of fuel drawn from the engine manifold can be specifically determined by the size and travel of the piston 24 in the ecology valve 20. The volume of fuel pulled from the engine manifold remains in the ecology valve 20 until start up.

Still referring to FIGS. 1 and 2, upon start up, the FPMU sends fuel through the check valve 12. Upon reaching a certain predetermined pressure value, the muscle valve 30 opens and flow passes to the engine manifold. As noted above, when the muscle valve 30 opens, the muscle valve 30 creates a pressure differential across the ecology valve 20 (e.g., pressure $P_2>P_3$) to drive the piston 24 to the right as shown in FIG. 1. As the piston 24 drives right, the shaft 25*a* reenters the housing 21 to reduce the volume of the interior 22 and send the fuel volume drained from the engine manifold back into the fuel system 10 for delivery to the engine manifold. The cycling between the positions shown in FIGS. 1 and 2 repeats as the engine starts and stops to desirably maintain the engine manifold drained during shutdown. As can be seen, the ecology valve 20 functions to both drain the engine manifold and store the drained volume of fuel within the closed system to advantageously remove the need for undesirable separate storage and/or return drain lines.

Alternative Embodiments

Figure 3:
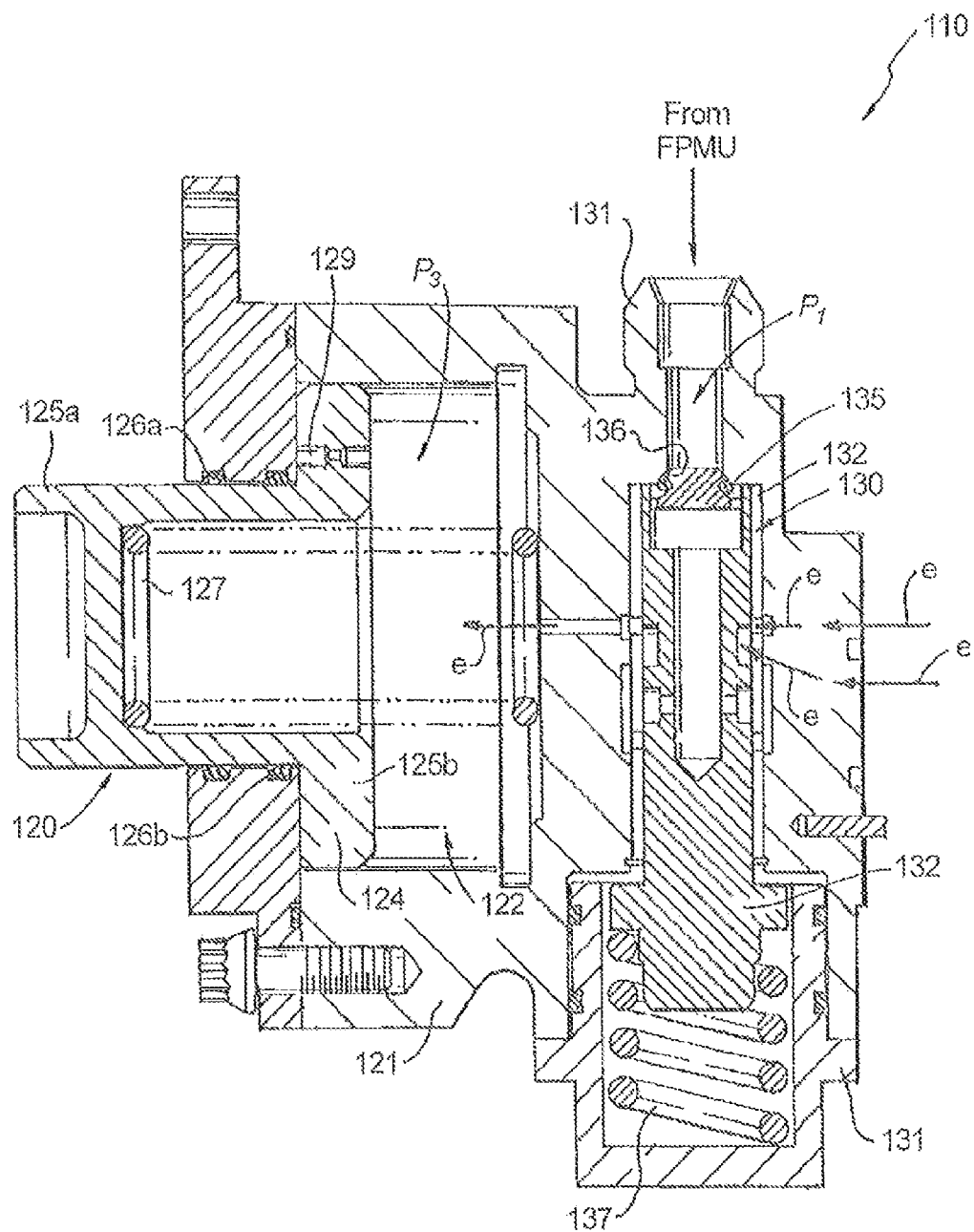
FIG. 3 is a schematic cross-sectional representation of a portion of another fuel system having another ecology valve constructed in accordance with the subject technology shown in the prestart/drained position.

Referring now to FIG. 3, a schematic cross-sectional representation of a portion of another fuel system 110 having an ecology valve 120 constructed in accordance with the subject technology is shown with the ecology valve 120 in the pre-start/drained position. In the prestart position, the fuel system 110 is not operational in that the FPMU is not delivering fuel, the engine manifold has been drained, and the moving components are in a steady-state. As will be appreciated by those of ordinary skill in the pertinent art, the fuel system 110 utilizes similar principles to the fuel system 10 described above. Accordingly, like reference numerals preceded by the numeral "1" are used to indicate like elements. The primary difference of the fuel system 110 in comparison to the fuel system 10 is the use of a flow divider 130 instead of a muscles valve to create a pressure differential across the ecology valve 120.

The flow divider 130 includes a housing 131 having a spool 132 slidably mounted in the housing 131 for smooth movement. A spring 137 biases the spool 132. Although not explicitly shown, the housing 131 defines an inlet and two outlets, which are represented by flow arrows in subsequent figures. One of ordinary skill in the art would be able to make and use the subject technology even though the inlet, the outlets and associated flowpaths are not explicitly shown.

In the prestart position, the pressure has equalized within the ecology valve 120 and the flow divider 130 so that the spring 127 has pushed the ecology valve piston 124 to the left and the flow divider spring 137 has pushed the spool 132 upwards. With the piston 124 to the left, a portion of the shaft 125 has extended out of the housing 121 to increase the ecology valve housing volume for storage of fuel drained from the engine manifold. With the spool 132 upward, the spool 132 has a valve seal 135 against a housing seat 136 to close off flow from the FPMU. The arrows "e" also represent two flowpaths established from the engine manifold so that the fuel therein can drain into the ecology valve 120 as described below.

Figure 4:
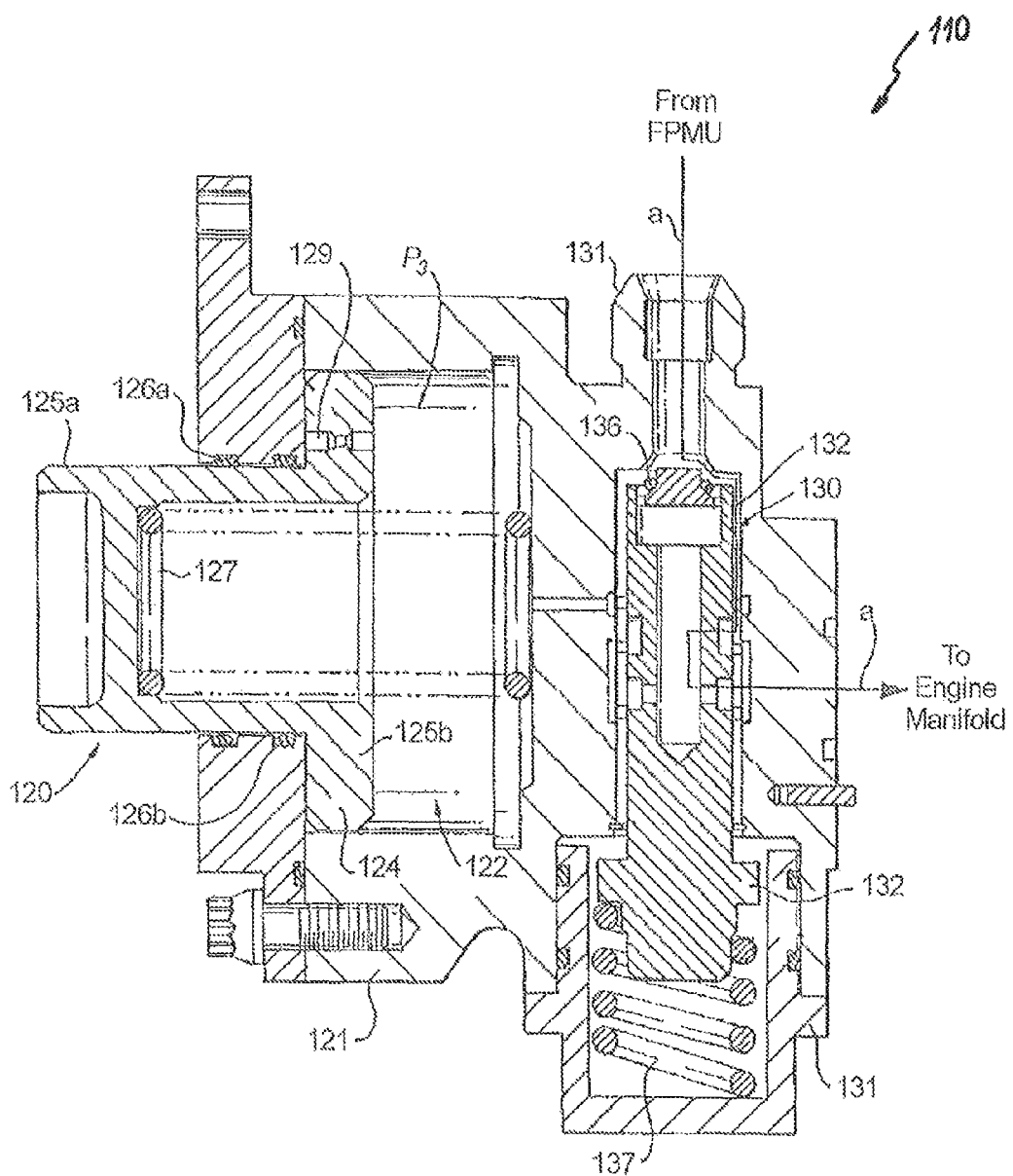
FIG. 4 is a schematic cross-sectional representation of the portion of the fuel system of FIG. 3 shown in a start position.

Referring now to FIG. 4, a schematic cross-sectional representation of a portion of the fuel system 110 is shown in a start mode position. To enter start mode, the FPMU begins sending fuel to the engine manifold. As the pressure rises in the fuel system 110, the spool 132 overcomes the force of spring 137 to move downward and open a primary flowpath to the engine manifold as represented by the arrows "a". Initially, the ecology valve spring 127 provides sufficient force to maintain the piston 124 to the left (e.g., in the non-operational position) as shown.

Figure 5:
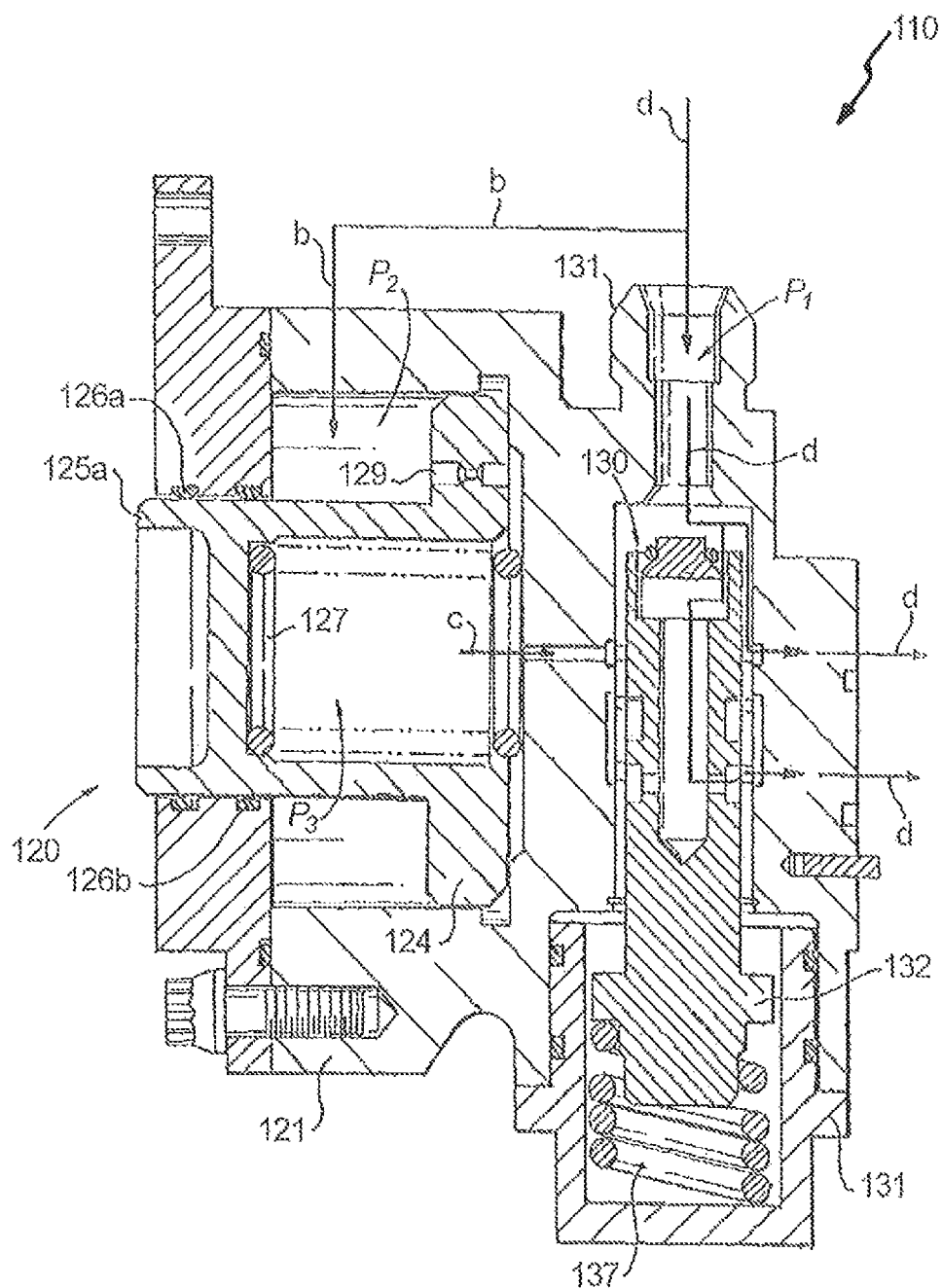
FIG. 5 is a schematic cross-sectional representation of the portion of the fuel system of FIG. 3 shown in the run position.

Referring now to FIG. 5, a schematic cross-sectional representation of the fuel system 110 is shown in the run position. As the fuel system comes up to pressure, additional fuel flow (denoted as arrows "b") to the ecology valve 120 from the FPMU creates pressure $P_2$ on the left side of the piston 124 whereas the flow divider 130 creates a lower pressure $P_3$ on the right side of the piston 124 within the housing 121. The pressure differential on the piston 124 overcomes the force of spring 127 and the piston 124 moves to the right. The piston shaft 125*a* moving into the interior 122 reduces the volume therein such that a specific volume of fuel (denoted as flowpath arrow "c") will flow from the interior 122 and through the spool 132 to the engine manifold. The main delivery of the fuel to the engine manifold is by the flowpath denoted by arrows "d". It is envisioned that during steady-state running, the only fuel delivered to the engine manifold travels along flowpath arrows "d".

Referring again to FIG. 3, upon shutdown, the fuel system 110 moves into the drained position shown. Similar to above, the fuel system is closed so that equalization to residual pressure occurs. With no pressure differential across the ecology valve piston 124, the piston 124 moves left and a portion of the shaft 125*a* extends out of the housing 121 to increase the ecology valve interior volume. The volume increase creates a pull or drain on the engine manifold along the flowpaths denoted by arrows "e". Hence again, the ecology valve 120 drains fuel from the engine manifold and stores the drained fuel.

While the subject invention has been described with respect to preferred embodiments, those skilled in the art will readily appreciate that various changes and/or modifications can be made to the invention without departing from the spirit or scope of the invention as defined by the appended claims.

What is claimed is:

1. An ecology valve for draining and storing fuel from a manifold of a gas turbine engine, the ecology valve comprising:
   a housing defining a piston interior having a run side shoulder and a shutdown side shoulder defining an opening opposing the run side shoulder, a first port in fluid communication with a fuel pump metering unit (FPMU) for receiving fuel output from the FPMU, and a second port in fluid communication with the manifold;

a piston mounted for sliding movement within the piston interior between a run position and a drain position, the piston having a shaft and a head portion, the head portion partitioning the piston interior into first and second pressure zones, the first pressure zone being in fluid communication with the first port and the second pressure zone being in fluid communication with the second port, the head portion also defining a passage for fuel flow between the first and second pressure zones of the piston interior, wherein in the run position, the head portion of the piston is against the run side shoulder with the shaft at least partially in the piston interior such that the piston interior contains a first volume of fuel, and in the drain position, the head portion moves away from the run side shoulder against the shutdown side shoulder so that the shaft extends further through the opening such that the piston interior contains a second volume of fuel, the second volume being greater than the first volume due to the shaft of the piston extending further through the opening; and a spring coupled between the housing and the piston to normally bias the piston in the drain position.

2. An ecology valve as recited in claim 1, further comprising at least one sealing o-ring mounted in the opening of the housing for sealing the shaft during movement between the run and drain positions.

3. An ecology valve as recited in claim 1, further comprising a restrictor in the housing in a flowpath of the second port.

4. A fuel system with a fuel pump metering unit (FPMU) for delivering fuel to an engine manifold, the fuel system comprising:

an ecology valve for draining and storing fuel from the engine manifold, the ecology valve including a housing having a piston dividing the housing into a first pressure zone in fluid communication with an output of the FPMU and a second pressure zone in fluid communication with the engine manifold, wherein the piston has a head portion that defines a passage to provide fluid communication between the first pressure zone and second pressure zone; and an assembly connected between the FPMU and engine manifold for selectively creating a pressure differential across the first pressure zone and second pressure zone of the housing when the FPMU delivers fuel to the engine manifold, wherein in a run position, the piston moves to decrease a volume within the interior as a result of the pressure differential, and in a drain position, the piston moves to increase the volume within the interior and thereby pull and store fuel from the engine manifold.

5. A fuel system as recited in claim 4, further comprising a spring coupled between the housing and the piston to normally bias the piston in the drain position.

6. A fuel system as recited in claim 4, wherein the piston includes a shaft extending from the head portion and further comprising at least one sealing o-ring mounted in an opening of the housing for sealing the shaft during movement between the run and drain positions.

7. A fuel system as recited in claim 6, wherein in the drain position, the shaft extends at least partially out of the opening.

8. A fuel system as recited in claim 6, wherein the head portion defines a passage for fuel flow between sides of the housing.

9. A fuel system as recited in claim 4, further comprising a restrictor between the housing and the engine manifold.

10. A fuel system as recited in claim 4, wherein the assembly is selected from the group consisting of a muscles valve, a flow divider, a pressurizing valve, a fixed orifice, and combinations thereof.

11. A fuel system as recited in claim 4, wherein the assembly is integral to the FPMU.

12. A method for draining fuel from an engine manifold comprising the steps of:

delivering fuel to the engine manifold;

coupling an ecology valve to the engine manifold;

creating an increase in a volume in the ecology valve during shutdown of delivery of the fuel such that the ecology valve pulls fuel from the engine manifold;

storing the drained fuel in the increased volume;

restarting delivery of fuel to the engine manifold;

creating a decrease in the volume to redeliver the drained fuel to the engine manifold, wherein the ecology valve includes a housing having a piston that moves between a drain position at least partially outside the housing to create the increase and a run position substantially within the housing to create the decrease, the piston having a shaft portion and a head portion partitioning the piston interior into first and second pressure zones; and providing a passage through the head portion of the piston for fuel flow between the first pressure zone and the second pressure zone.

13. A method as recited in claim 12, further comprising the step of normally biasing the piston into the drain position.

14. A method as recited in claim 12, further comprising the step of creating a pressure differential across the piston when delivering fuel to the engine manifold to move the piston into the run position.

* * * * *